United States Patent
Ting et al.

(10) Patent No.: US 6,411,357 B1
(45) Date of Patent: Jun. 25, 2002

(54) ELECTRODE STRUCTURE FOR A WIDE VIEWING ANGLE LIQUID CRYSTAL DISPLAY

(75) Inventors: Dai-Liang Ting, Hsinchu; Lisen Chuang, Penghu; Ching-Chao Chang, Taipei, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/483,416

(22) Filed: Jan. 14, 2000

(30) Foreign Application Priority Data

Sep. 13, 1999 (TW) ..................... 88108187A01

(51) Int. Cl.⁷ ............................ G02F 1/1343
(52) U.S. Cl. ...................... 349/141; 349/146
(58) Field of Search .................. 349/141, 143, 349/123, 146

(56) References Cited

U.S. PATENT DOCUMENTS 5,745,207 A * 4/1998 Asada et al. ............. 349/141
6,288,763 B1 * 9/2001 Hirota ..................... 349/141

* cited by examiner

Primary Examiner—William L. Sikes
Assistant Examiner—Dung Nguyen

(57) ABSTRACT

An electrode structure for a liquid crystal display includes a layer of pixel electrodes each having a herringbone-shaped structure, a passivation layer and a layer of common electrodes. The pixel electrodes are formed in parallel above the common electrodes. The herringbone-shaped structure of a pixel electrode has a predefined turning angle between 45 degrees to 90 degrees. The pixel electrode structure allows the liquid crystals in the display to rotate in two directions, clockwise and counterclockwise, to compensate for the color dispersion caused by a wide viewing angle.

8 Claims, 4 Drawing Sheets

ELECTRODE STRUCTURE FOR A WIDE VIEWING ANGLE LIQUID CRYSTAL DISPLAY

FIELD OF THE INVENTION

The present invention relates generally to an electrode structure of a liquid crystal display, and more particularly to an electrode structure of a wide viewing angle liquid crystal display.

BACKGROUND OF THE INVENTION

A large number of liquid crystal display (LCD) panels have recently been employed as display devices in electronic products. The technologies of wide viewing angle liquid crystal displays have been disclosed very often in recent years. In a Taiwan patent application No. 88108187 entitled "Electrode Structure of A Wide Viewing Angle Liquid Crystal Display", an electrode structure for providing wide viewing angle is disclosed. The electrode structure comprises an upper electrode layer having multiple comb-shaped and parallel conductors on a glass substrate, a lower electrode layer having a TN-type conductor and a layer of non-conductive insulator formed between the upper and lower electrode layers.

In the embodiment of the Taiwan patent application, the pixel electrodes in the upper layer of the electrode structure has a comb-shaped structure while the common electrode in the lower layer has a plate-shaped structure. A layer of negative-type liquid crystal is used to fill the space between the upper and lower glass substrates of the LCD. The two electrode layers are fabricated on the lower glass substrate.

The drawback of the electrode structure disclosed in the Taiwan patent application is that the liquid crystal driven by an electric voltage rotates toward one direction. Therefore, the effect of color dispersion at different viewing angle limits the viewing angle of the LCD and degrades the quality of the display.

SUMMARY OF THE INVENTION

The present invention has been made to overcome the above-mentioned drawback of the electrode structure in the prior art. The primary object of the invention is to provide an electrode structure for a wide viewing angle liquid crystal display. The electrode structure has upper and lower electrode layers. The pixel electrode in the upper layer has a herringbone-shaped structure while the common electrode in the lower layer has a plate-shaped structure.

The liquid crystal display has two separated glass substrates between which liquid crystals are filled. Multiple scan signal lines, multiple data signal lines, multiple switching elements, and a layer of common electrodes are fabricated on the surface of the lower glass substrate. The scan signal lines are perpendicular to the data signal lines in order to form a pixel matrix. A passivation layer made of a transparent non-conductive insulator is formed between the layer of pixel electrodes and the layer of common electrodes.

The herringbone-shaped structure of the pixel electrodes allows the liquid crystal molecules to rotate in two directions, clockwise and counterclockwise. The color dispersion caused by a wide viewing angle is thus compensated for. The herringbone-shaped structure also helps to maintain the brightness of pixels.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

Figure 1:
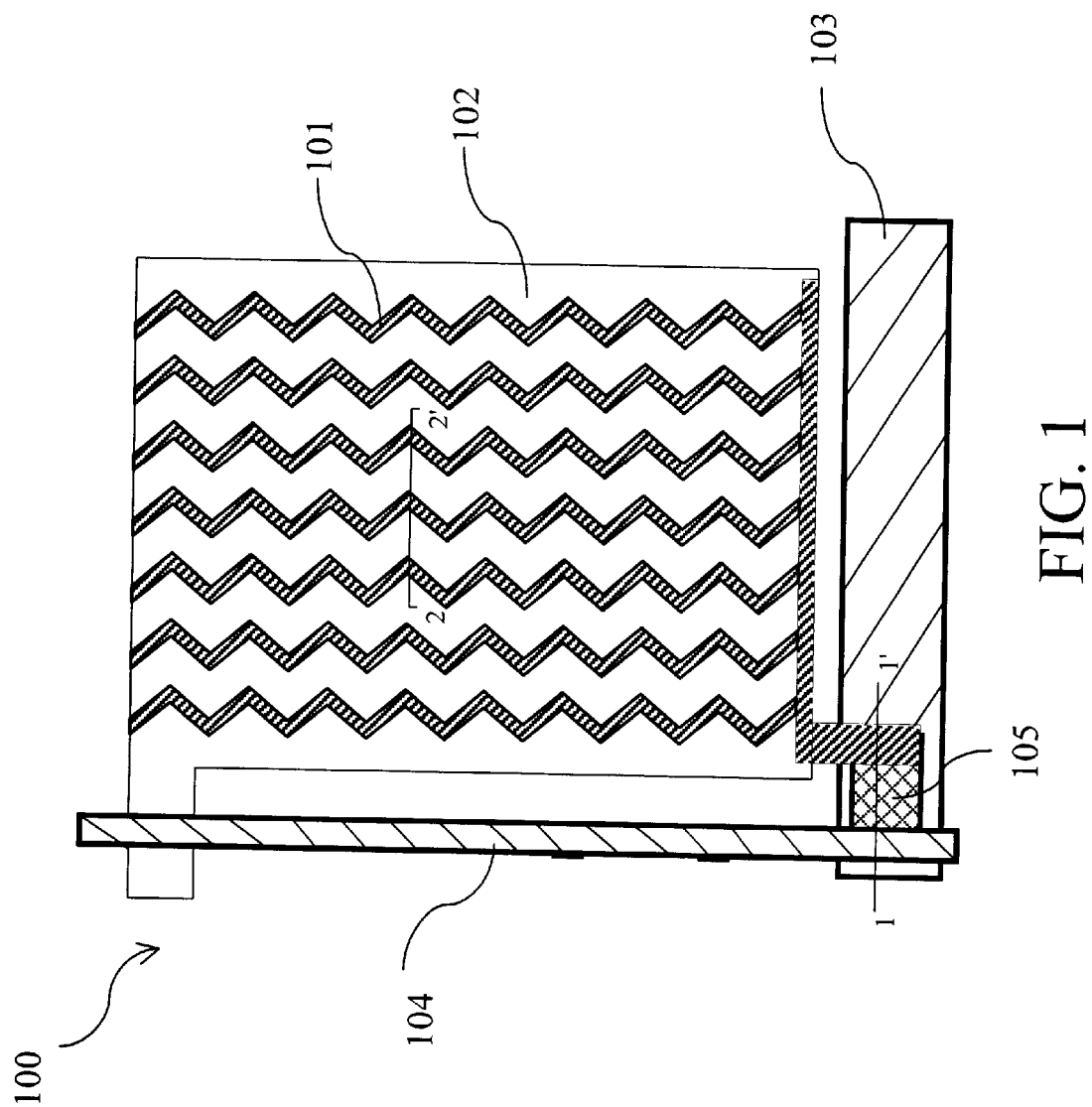
FIG. 1 is a top view showing the electrode structure of a single pixel for a wide viewing angle liquid crystal display according to the preferred embodiment of the present invention.

FIG. 1 is a top view showing the electrode structure 100 of a single pixel for a wide viewing angle liquid crystal display according to the preferred embodiment of the present invention. Referring to FIG. 1, the upper layer of the electrode structure 100 comprises a plurality of pixel electrodes 101 each having a herringbone-shaped structure while the lower layer comprises a common electrode 102 having a plate-shaped structure. The scan signal line region 103 is perpendicular to the data signal line region 104 to form a pixel.

As shown in FIG. 1, a thin film transistor 105 used as a switching device is located near the crossing point of the scan signal line region 103 and the data signal line region 104 in a single pixel. The scan signal line region 103 and the data signal line region 104 are adjacent to the area where the pixel electrodes 101 are formed.

The thin film transistor is an active switching device that controls the charging and discharging of the pixel electrodes. In addition to the thin film transistor, the active switching device may also be a Metal Oxide Semiconductor (MOS) transistor, a diode, a Metal-Insulator-Metal (MIM) transistor or a variable resistor according to the invention.

The following illustrates in detail the electrode structure of a wide viewing angle liquid crystal display of the present invention. The electrode structure including a common electrode layer, a pixel electrode layer, and a passivation layer is formed above a glass substrate. On the top surface of the glass substrate, there are multiple scan signal lines, multiple data signal lines, multiple switching elements, and a layer of common electrodes. The passivation layer is made of a transparent non-conductive insulator and located between the common electrode layer and the pixel electrode layer. The passivation layer can be formed by depositing or growing an insulator film on the thin film transistor.

For every single pixel, the data signal line is located above and perpendicular to the scan signal line. At least a switching element such as a thin film transistor 105 is fabricated near the crossing point of the scan signal line and the data signal line. The gate terminal of the switching element connects to the scan signal line, the drain terminal connects to the data signal line and the source terminal connects to the pixel electrode.

Figure 2:
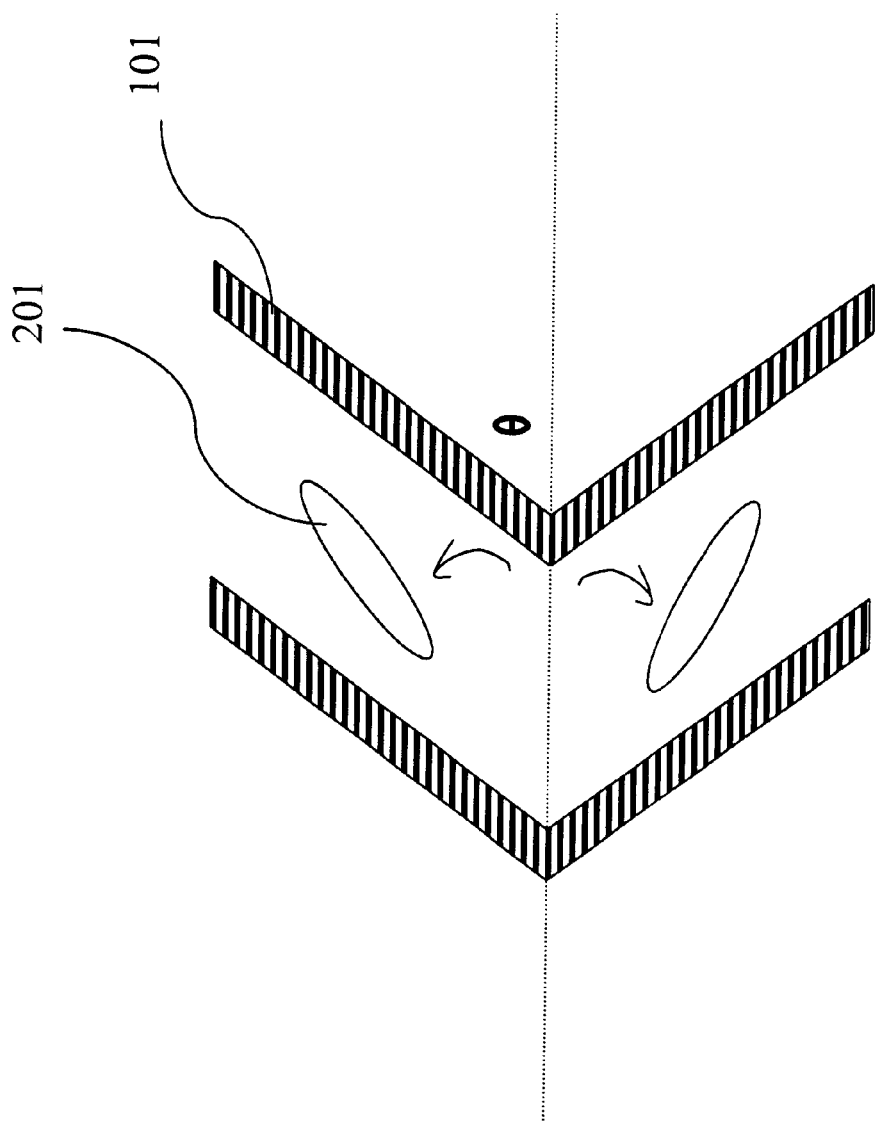
FIG. 2 shows the liquid crystal rotates in two opposite directions according to the electrode structure of the present invention.

As mentioned above, the pixel electrode has a herringbone-shaped structure. Pixel electrodes are formed in parallel. The turning angle θ shown in FIG. 2 in the herringbone-shaped structure is within a pre-defined range, about 45 to 90 degrees. The herringbone-shaped structure of the pixel electrodes allows the liquid crystal molecules 201 to rotate in two directions, clockwise and counterclockwise. As shown in FIG. 2, the liquid crystal molecules 201 rotates in both clockwise and counterclockwise directions by a Ø angle. The color dispersion-caused by a viewing angle is thus compensated for and the effect of color dispersion is reduced.

The herringbone-shaped structure of the pixel electrodes maintains the brightness above the pixel electrodes in the certain range of Ø. The intensity is proportional to the square of sin 2Ø, therefore, if the turning angle θ is less than 45 degrees, the maximal value of Ø is also less than 45 degrees. The pixel brightness will not reach its maximum value.

According to the invention, the electrode pitch in the layer of pixel electrodes is about 1 to 15 µm and the electrode width is about 1 to 10 µm. In the structure of a single pixel, the herringbone-shaped pixel electrodes 101 and the common electrode 102 both keep a distance from the scan signal line region 103 and the data signal line. region 104. They do not cross over the scan signal line region 103 and the data signal line region 104.

Figure 3:
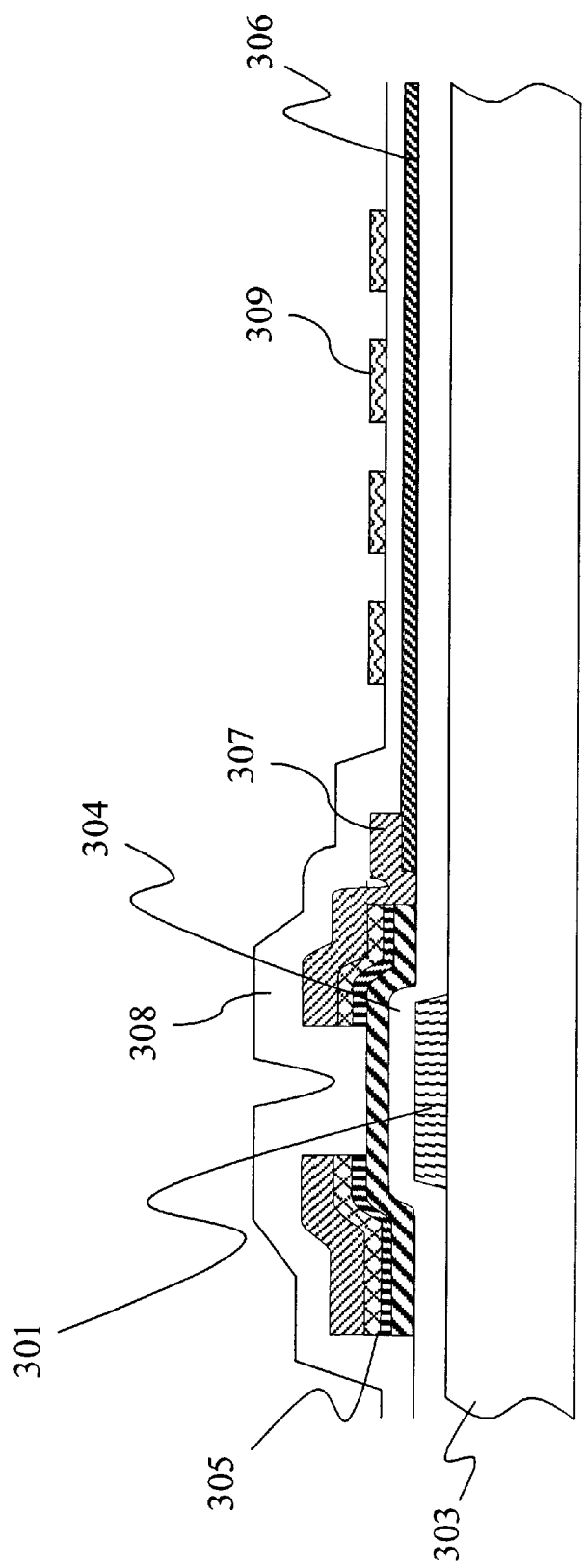
FIG. 3 shows the cross section along line 1-1' and line 2-2' of FIG. 1.

FIG. 3 shows the cross section along line 1–1' and line 2–2' of FIG. 1. Along line 1–1' of FIG. 1 is the steps of fabricating the thin film transistor, the data line and the scan line. Along line 2–2' is the steps of fabricating the pixel electrodes 101 and the common electrode 102.

Referring to FIG. 3, the cross section along line 1–1' of FIG. 1 illustrates in detail every layer of the structure above the substrate. A metallic layer of the scan signal line 301 is first formed above the glass substrate 303. Then, the glass substrate 303 is covered with an insulator layer 304 and an island-like region 305 is formed to provide an active layer for the thin film transistor. The thin film transistor comprises at least a gate, a drain, and a source. The gate terminal of the thin film transistor connects to the scan signal line 301, the drain terminal connects to the data signal line 307 and the source terminal connects to the pixel electrodes 306.

The present invention forms a layer of plate-shaped common electrodes 306. The plate-shaped common electrodes 306 can be made of transparent or non-transparent conductive materials. The general transparent conductive materials may be indium-tin-oxide (ITO), $SnO_2$, N type amorphous silicon film, N type poly-silicon film, P type poly-silicon film, and ZnO, etc. Non-transparent conductive material may be other metallic material. The plate-shaped common electrodes 306 do not cross over the island-like region 305, as shown in FIG. 3.

Above the island-like region 305 is a metallic layer of data signal lines 307. A passivation layer 308 is further used to cover the substrate. Similarly, the electric contact with the data signal line metallic layer 307 can be established by forming multiple contact holes outside the pixel region.

Along line 2–2' of FIG. 1 is the steps of forming the layer of pixel electrodes. A layer of herringbone-shaped pixel electrodes 309 is fabricated above the layer of common electrodes 306 and the passivation layer 308. The herringbone-shaped pixel electrodes 309 can be made of transparent or non-transparent conductive materials.

As mentioned above, the structure of the herringbone-shaped pixel electrodes preserves the brightness of pixels.

Figure 4:
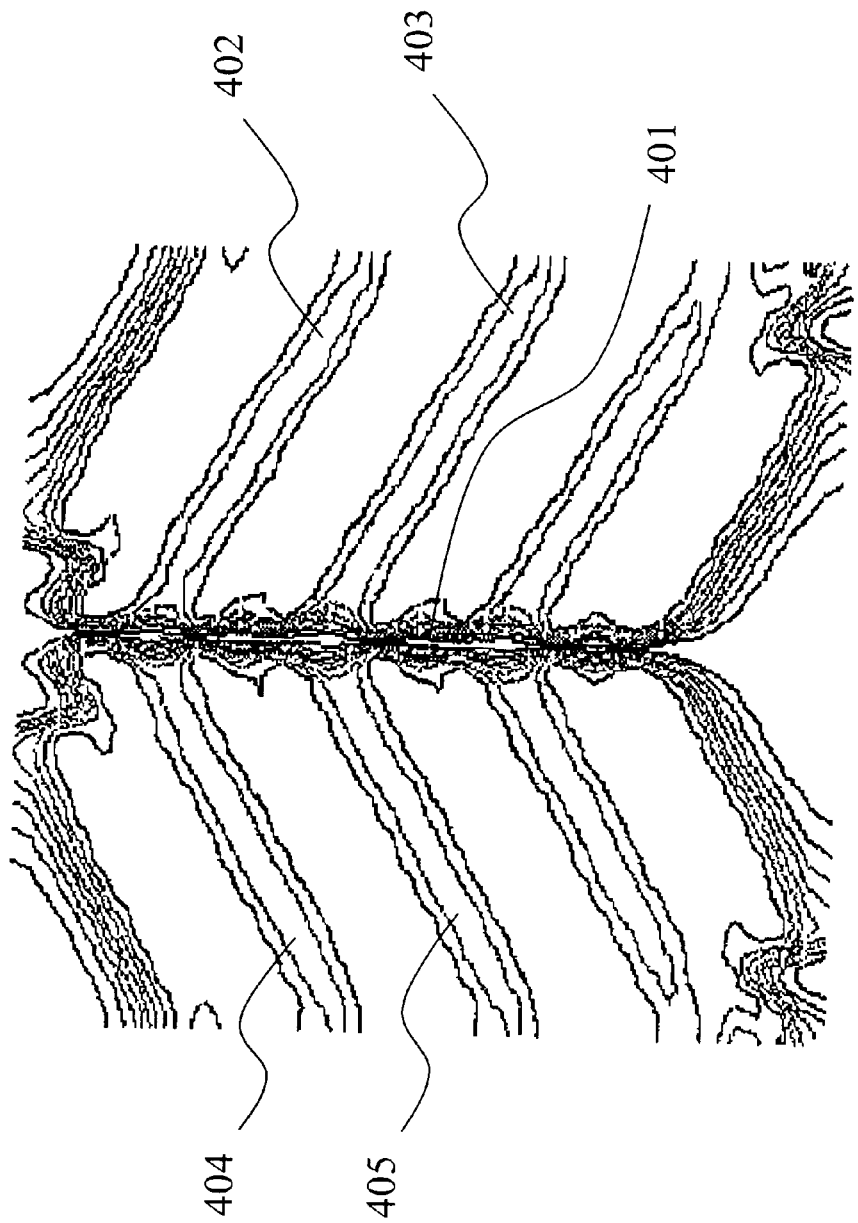
FIG. 4 illustrates the brightness distribution in a single pixel of the electrode structure of the present invention when an electric voltage is applied.

FIG. 4 illustrates the distribution of brightness in a single pixel of the electrode structure of the present invention when an electric voltage is applied. The brightness at the middle portion 401 of the herringbone-shaped pixel electrode is almost zero. However, more than 70% effective transmission of light can be achieved at regions 402, 403, 404, and 405 that are parallel to each other.

Although this invention has been described with a certain degree of particularity, it is to be understood that the present disclosure has been made by way of preferred embodiments only and that numerous changes in the detailed structure and combination as well as arrangement of parts may be restored to without departing from the spirit and scope of the invention as hereinafter set forth.

What is claimed is:

1. An electrode structure of a wide viewing angle liquid crystal display comprising:

a scan signal line;

a data signal line perpendicular to said scan signal line, said scan signal line and said data signal line defining a pixel area;

a common electrode in said pixel area;

a passivation layer above said common electrode; and a plurality of pixel electrodes each having a herringbone-shaped structure and running substantially in parallel with said data signal line above said passiviation layer and said common electrode;

wherein said common electrode has a plate-shaped structure substantially filling said pixel area below said plurality of pixel electrodes.

2. The electrode structure of a wide viewing angle liquid crystal display as claimed in claim 1, said herringbone-shaped structure having a turning angle ranging from 45 degrees to 90 degrees.

3. The electrode structure of a wide viewing angle liquid crystal display as claimed in claim 1, said plurality of pixel electrodes having a pitch ranging from 1 to 15 µm and the width of each pixel electrode ranging from 1 to 10 µm.

4. The electrode structure of a wide viewing angle liquid crystal display as claimed in claim 1, wherein said common electrode is made of indium-tin-oxide, $SnO_2$, N-type amorphous silicon film, N type poly-silicon film, P type poly-silicon film, or ZnO.

5. The electrode structure of a wide viewing angle liquid crystal display as claimed in claim 1, wherein said pixel electrodes are made of indium-tin-oxide, $SnO_2$, N-type amorphous silicon film, N type poly-silicon film, P type poly-silicon film, or ZnO.

6. The electrode structure of a wide viewing angle liquid crystal display as claimed in claim 1, wherein said pixel electrodes are made of metal material.

7. The electrode structure of a wide viewing angle liquid crystal display as claimed in claim 1, further comprising a switching device.

8. The electrode structure of a wide viewing angle liquid crystal display as claimed in claim 7, said switching device being a thin film transistor.

* * * * *

(12) INTER PARTES REEXAMINATION CERTIFICATE (871st)
United States Patent
Ting et al.

(10) Number: US 6,411,357 C1
(45) Certificate Issued: May 8, 2014

(54) ELECTRODE STRUCTURE FOR A WIDE VIEWING ANGLE LIQUID CRYSTAL DISPLAY

(75) Inventors: Dai-Liang Ting, Hsinchu (TW); Lisen Chuang, Penghu (TW); Ching-Chao Chang, Taipei (TW)

(73) Assignee: Industrial Technology Research Institute, Chutung, Hsinchu (TW)

Reexamination Request:
No. 95/002,133, Sep. 4, 2012

Reexamination Certificate for:
Patent No.: 6,411,357
Issued: Jun. 25, 2002
Appl. No.: 09/483,416
Filed: Jan. 14, 2000

(30) Foreign Application Priority Data

Sep. 13, 1999 (TW) .............................. 88108187 A

(51) Int. Cl.
*G02F 1/1343* (2006.01)

(52) U.S. Cl.
USPC ............................................ 349/141; 349/146

(58) Field of Classification Search
None
See application file for complete search history.

(56) References Cited

To view the complete listing of prior art documents cited during the proceeding for Reexamination Control Number 95/002,133, please refer to the USPTO's public Patent Application Information Retrieval (PAIR) system under the Display References tab.

*Primary Examiner* — Minh Nguyen

(57) ABSTRACT

An electrode structure for a liquid crystal display includes a layer of pixel electrodes each having a herringbone-shaped structure, a passivation layer and a layer of common electrodes. The pixel electrodes are formed in parallel above the common electrodes. The herringbone-shaped structure of a pixel electrode has a predefined turning angle between 45 degrees to 90 degrees. The pixel electrode structure allows the liquid crystals in the display to rotate in two directions, clockwise and counterclockwise, to compensate for the color dispersion caused by a wide viewing angle.

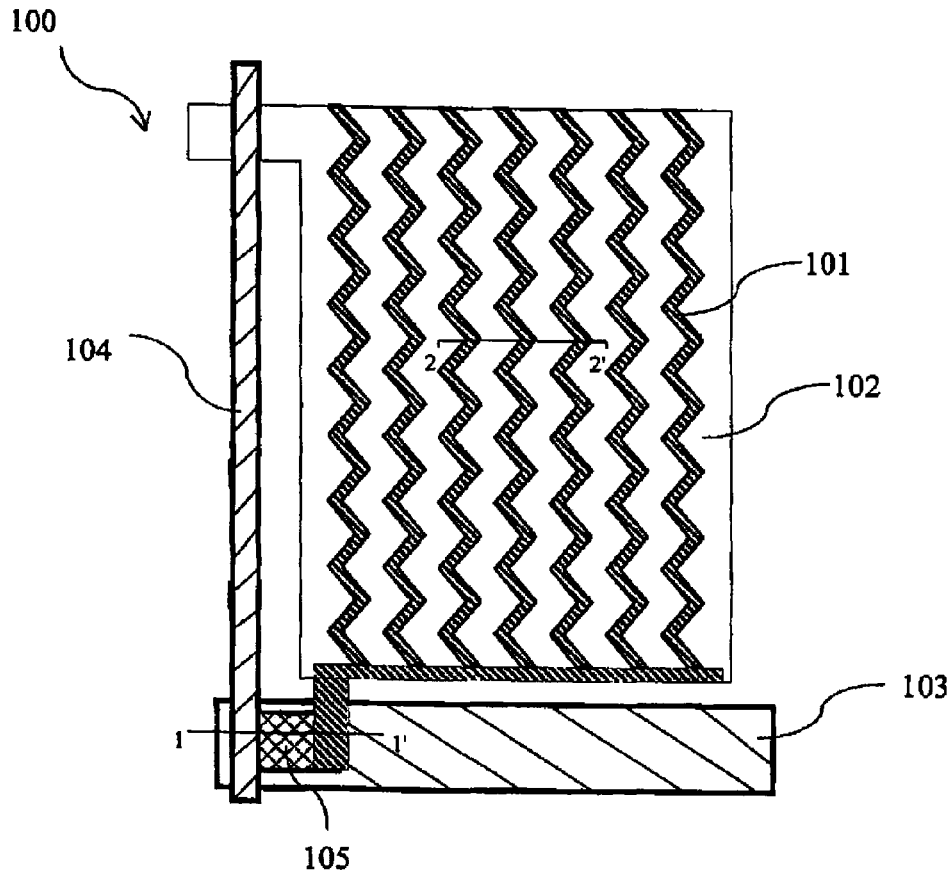

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1, 7 and 8 are cancelled.

Claims 2-6 were not reexamined.

\* \* \* \* \*